United States Patent
Ling et al.

(10) Patent No.: US 12,242,342 B2
(45) Date of Patent: Mar. 4, 2025

(54) FAST MEMORY ECC ERROR CORRECTION

(71) Applicant: Intel Corporation, Santa Clara, CA (US)

(72) Inventors: Jing Ling, Milpitas, CA (US); Wei P. Chen, Portland, OR (US); Rajat Agarwal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 415 days.

(21) Appl. No.: 17/550,859

(22) Filed: Dec. 14, 2021

(65) Prior Publication Data

US 2022/0107866 A1    Apr. 7, 2022

(51) Int. Cl.
*G06F 11/10*    (2006.01)
*G06F 11/14*    (2006.01)

(52) U.S. Cl.
CPC ...... *G06F 11/1068* (2013.01); *G06F 11/1402* (2013.01)

(58) Field of Classification Search
None
See application file for complete search history.

(56) References Cited

U.S. PATENT DOCUMENTS

| | | | |
|---|---|---|---|
| 5,754,563 A | 5/1998 | White | |
| 9,477,550 B2 * | 10/2016 | Goodman | G06F 11/1052 |
| 9,817,712 B2 | 11/2017 | Nakanishi et al. | |
| 2011/0047440 A1 * | 2/2011 | Blackmon | G06F 11/141 |
| | | | 714/764 |
| 2013/0080858 A1 * | 3/2013 | Lee | G11C 11/5642 |
| | | | 714/E11.054 |
| 2013/0111308 A1 | 5/2013 | Sauber et al. | |
| 2015/0378823 A1 * | 12/2015 | Lesartre | G06F 11/1048 |
| | | | 714/764 |
| 2016/0004597 A1 * | 1/2016 | Tsern | G11C 29/52 |
| | | | 714/764 |
| 2019/0171518 A1 * | 6/2019 | Pruett | G06F 11/1012 |
| 2019/0332469 A1 | 10/2019 | Radjai et al. | |
| 2020/0278906 A1 * | 9/2020 | Bains | G06F 11/1052 |
| 2021/0019227 A1 * | 1/2021 | Shin | G06F 11/1048 |

OTHER PUBLICATIONS

J. Kim, M. Sullivan, S. Lym and M. Erez, "All-Inclusive ECC: Thorough End-to-End Protection for Reliable Computer Memory," 2016 ACM/IEEE 43rd Annual International Symposium on Computer Architecture (ISCA), Seoul, Korea (South), 2016, pp. 622-633, (Year : 2016).*
Dutch Examination Report for Patent Application No. 2033511, Mailed Aug. 31, 2023, 7 pages.

* cited by examiner

*Primary Examiner* — Daniel F. McMahon
(74) *Attorney, Agent, or Firm* — Compass IP Law PC

(57) ABSTRACT

A memory controller having an error checking and correction (ECC) circuitry can detect an error in data being read from memory and correct that error with a retry flow without needing to send another read to the memory for the data. The read data is stored in a read data buffer (RDB) at the memory controller when the read data is received from memory. The memory controller has an error detection path from the RDB to the host and an error correction path. Read data that has no errors can be sent directly to the host. Instead of flushing the RDB in response to the error detection, the memory controller executes a retry flow, where the RDB provides the read data to the error correction path for error correction.

19 Claims, 7 Drawing Sheets

FAST MEMORY ECC ERROR CORRECTION

FIELD

Descriptions are generally related to memory systems, and more particular descriptions are related to error checking and correction (ECC).

BACKGROUND

Memory systems employ error checking and correction (ECC) to increase the system's reliability and reduce the risk of system faults and crashes. ECC is commonly executed on the memory die, at the memory controller of the host, or both. The host reads data from memory. ECC circuitry checks for errors in data read from memory before making the data available for the host. ECC circuitry performs error detection, where an error in the data is detected, and error correction, where the detected error is corrected.

With simple ECC correction schemes like single error correction double error detection (SECDED), inline correction can be performed. Inline correction is used, for example, when a cacheline is read. In inline correction, the read data goes through both error detection and correction logic. Therefore, the data passes through the error correction logic even for a read with no error. Passing through the error correction logic adds one or more clock cycles of delay in the traffic stream.

The server ECC that performs more complex correction of full device corruption takes longer to complete correction. Therefore, ECC detection and correction are performed separately. The read data first passes through error detection logic. Then, the error correction logic is engaged when an error in the read data is detected. When error correction logic is engaged, the traffic is stopped, and the read data with error is reread from memory for a second time and passed through the error correction logic. The time required to complete the full retry flow usually takes thousands of clock cycles.

FIG. 1A illustrates the timing diagram that compares inline error correction and ECC with separate detection and correction data paths with no error in the read data. Clock 102 represents a timing signal for the system and provides a reference for the flow of information. Each read from memory provides two elements (also referred to as data packets or words) of read data, denoted by D0 and D1 in the DataIn 104 timing diagram. In inline correction, read data without error passes through both error detection and error correction logic. In the example of FIG. 1A, it takes one clock cycle for the data to pass through error detection logic and one clock cycle for the read data to pass through the error correction logic. Inline correction 106 shows that D0 is available at the output of inline correction 106 two clock cycles after D0 is available in DataIn 104.

Similarly, FIG. 1A shows that D1 appears on inline correction 106 two clock cycles after D1 is available on DataIn 104. The Detection timing diagram 108 indicates that the read data is returned in a system where the error detection path is separate from the error correction path. The figure shows that it takes one clock cycle to return the read data without error. For the no error case, SECDED code with inline correction would usually require two clock cycles, while ECC with separate detection and correction paths performs only detection, which takes one clock cycle.

FIG. 1B illustrates the timing diagram that compares inline correction and ECC with separate detection and correction data paths when there is an error in the read data. Inline correction 106 shows the timing of inline correction, which is the same as the case for FIG. 1A, wherein inline correction logic returns the data in two clock cycles. However, the retry flow requires a long time to return data for the ECC correction with separate data paths for ECC detection and ECC correction. Retry flow 110 illustrates a timing diagram of server ECC correction with a separate data path for detection and correction where the retry delay is on the order of one thousand clock cycles or more. The retry flow has increased delay because the procedure requires the traffic to stop to reread the data with the error from memory. Once the data is reread, it passes through complex ECC correction logic, which can add a further delay.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Descriptions of certain details and implementations follow, including non-limiting descriptions of the figures, which may depict some or all examples, as well as other potential implementations.

DETAILED DESCRIPTION

As described herein, a memory controller having error checking and correction (ECC) circuitry can detect and correct an error in data being read from memory with a retry flow. The retry flow enables access to data from a read data buffer when an error is detected. Accessing the data from the read data buffer significantly reduces the delay introduced by an error correction flow.

Using the stored read data in a read data buffer (RDB) in the retry flow would allow fast ECC error correction and avoid the long latency of the legacy method caused by blocking traffic and flushing pending transactions. In addition, the use of data from the RDB for the error correction flow reduces the overhead when errors occur more often.

As described herein, ECC circuitry has two data paths: detection data path, referred to as first data path, and correction data path, referred to as second data path. The error detection circuitry processes the read data on the first data path. If the ECC error detection circuitry does not detect any ECC error in the read data, the read data is made available on the host internal data bus. In one example, the read data can be buffered first in reordering circuitry so that all the data are made available on the data bus in the order they were requested.

A retry flow is triggered if error detection circuitry detects an ECC error in the read data. The retry flow stops the execution of new read commands. However, the retry flow does not flush the outstanding reads from the RDB. Instead, validated read commands are completed first. Then, a retry command is sent to the read data buffer to reread the read data in which the error was detected. The read data is made available to the error correction circuitry on the second data path. If the error correction logic successfully corrected the error, the corrected read data is returned to the data bus.

In one example, the corrected read data will pass through reordering circuitry. If the error correction logic was unable or unsuccessful in correcting the data, an indication is made to the host system that the error was uncorrectable.

Figure 1A:
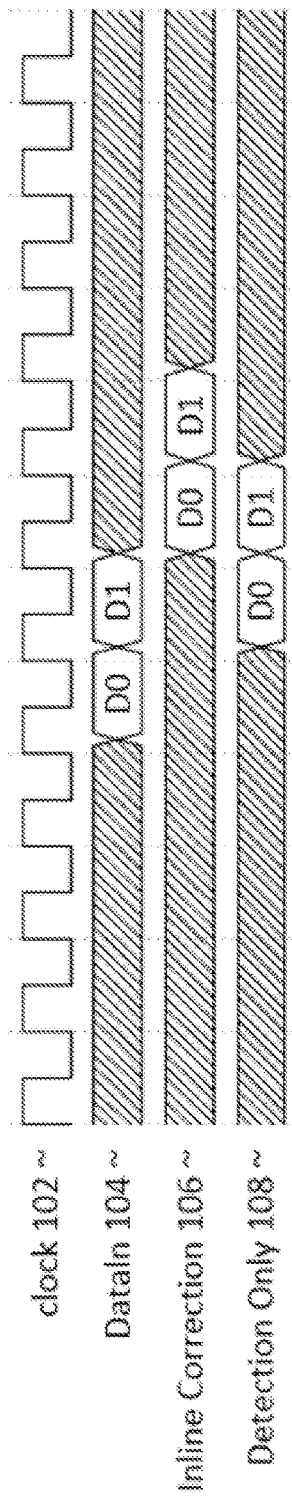
FIG. 1A illustrates the timing diagram that compares inline error correction and ECC with separate detection and correction data paths with no error in the read data.
Figure 1B:
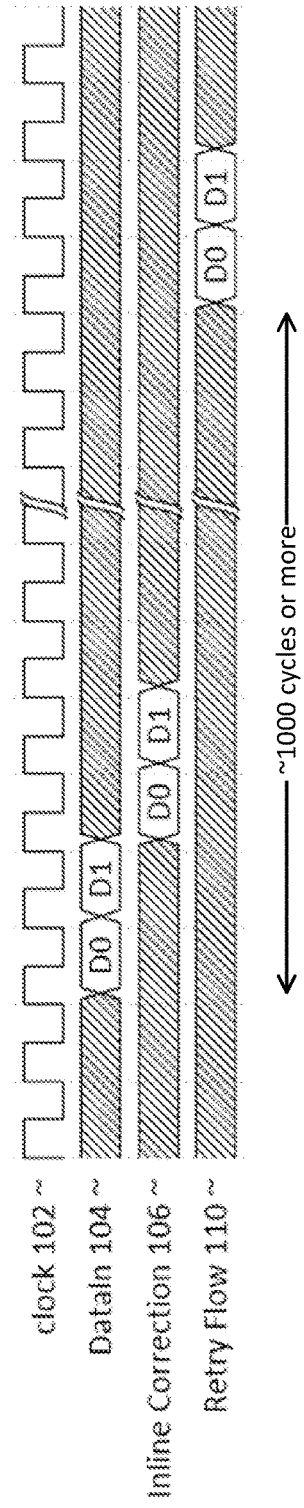
FIG. 1B illustrates the timing diagram that compares inline correction and ECC with separate detection and correction data paths when there is an error in the read data.
Figure 2:
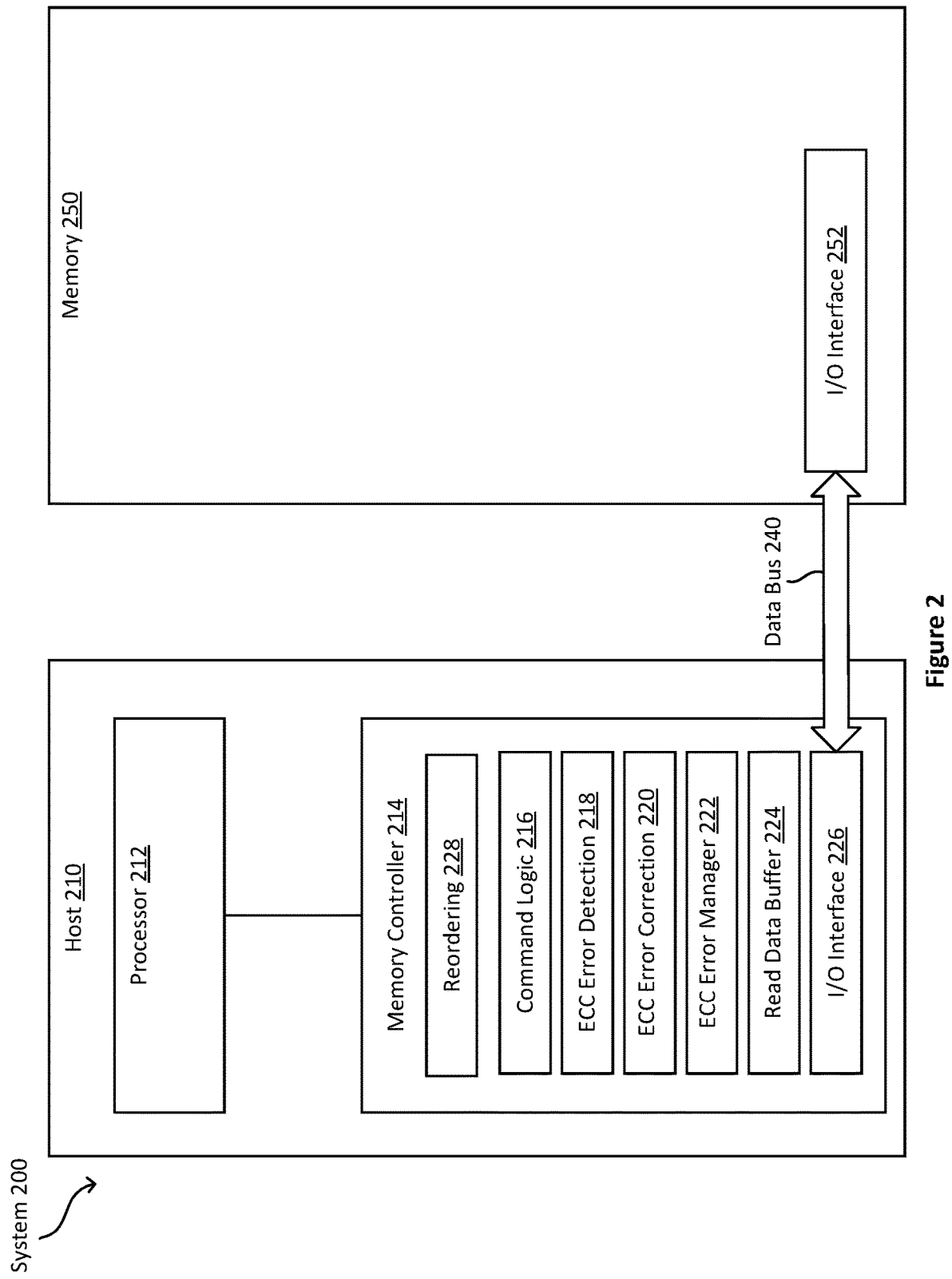
FIG. 2 is a block diagram of a system utilizing a memory controller.

FIG. 2 is a block diagram of a system utilizing a memory controller. A computing system receives commands to perform operations on operands. The commands and operands are stored in a memory. The processor receives the commands and operands from memory, performs the intended computation, and stores information in the memory if needed.

System 200 includes the host circuitry 210 and memory circuitry 250. Host circuitry 210 includes processor logic 212 and memory controller logic 214.

Processor logic 212 can be or include a System on Chip (SoC), a Field Programmable Gate Array (FPGA), Central Processing Unit (CPU), an accelerator, a Graphics Processing Unit (GPU), or other logic. Processor 212 is communicatively coupled with memory 250 via memory controller 214 and data bus 240. Processor 212 represents a single core or a multicore processor.

Memory controller 214 controls and regulates access to memory circuitry 250 by processor 212. When processor 212 requires data, memory controller 214 generates a read command and receives the data from memory circuitry 250. Similarly, when processor 212 requires storing data in the memory, memory controller logic 214 generates a write command to cause the memory to store the data.

Data bus 240 transfers the data between host 210 and memory circuitry 250. The input/output interfaces (I/O) 226 and 252 make the data available on the data bus 240. When a read command is executed, the memory controller input/output (I/O) interface 252 receives the data from memory I/O interface 226 and sends the read data to processor 212. When a write command is executed, memory controller 214 sends data to memory circuitry 250 using I/O interfaces 226 and 252 over data bus 240.

In one example, memory controller logic 214 is implemented in hardware. In one example, memory controller logic 214 is implemented in software. In one example, memory controller logic 214 is implemented as a combination of hardware and software. As used herein, "logic" can include hardware logic (e.g., circuitry) or software logic, or a combination of hardware logic and software logic.

In some example implementations, the processor requests data in a specific order. For example, when there are dependencies among the data. Another example is when the processor executes operations related to different threads or programs. The data associated with a thread or program can only be used when the processor executes the corresponding thread or program. Reordering logic 228 ensures that processor logic 212 receives the data in the same order requested.

I/O interface logic 226 interfaces between host circuitry 210 and memory circuitry 250. Command logic 216 generates and executes commands for accessing memory circuitry 250. For example, to obtain data from memory circuitry 250, command logic 216 generates a read command and sends the read command to memory circuitry 250 for execution. Execution of a read command retrieves data from a specific address or location in memory circuitry 250 and returns the data to host 210. Memory controller 214 stores the data obtained from memory, also referred to as read data, in a read data buffer (RDB) circuitry 224. RDB circuitry 224 is a small memory that temporarily holds the read data before passing it through the ECC logic. In one example, RDB circuitry 224 is a scratchpad memory. A scratchpad memory is a high-speed memory that holds data for rapid retrieval.

The Error Checking and Correction (ECC) logics are responsible for detecting and correcting errors in the data. ECC error detection logic 218 receives the read data from read data buffer circuitry 224 and investigates it for any error. ECC error correction logic 220 performs operations to correct errors in the read data. ECC error detection logic 218 and ECC error correction logic 220 are regulated and managed by ECC error manager logic 222.

Memory circuitry 250 includes the memory cell arrays and logic (not shown in FIG. 2) and the I/O interface 252. I/O interface 252 connects the memory cells to bus 240. The memory can be or include volatile or nonvolatile memory.

Figure 3:
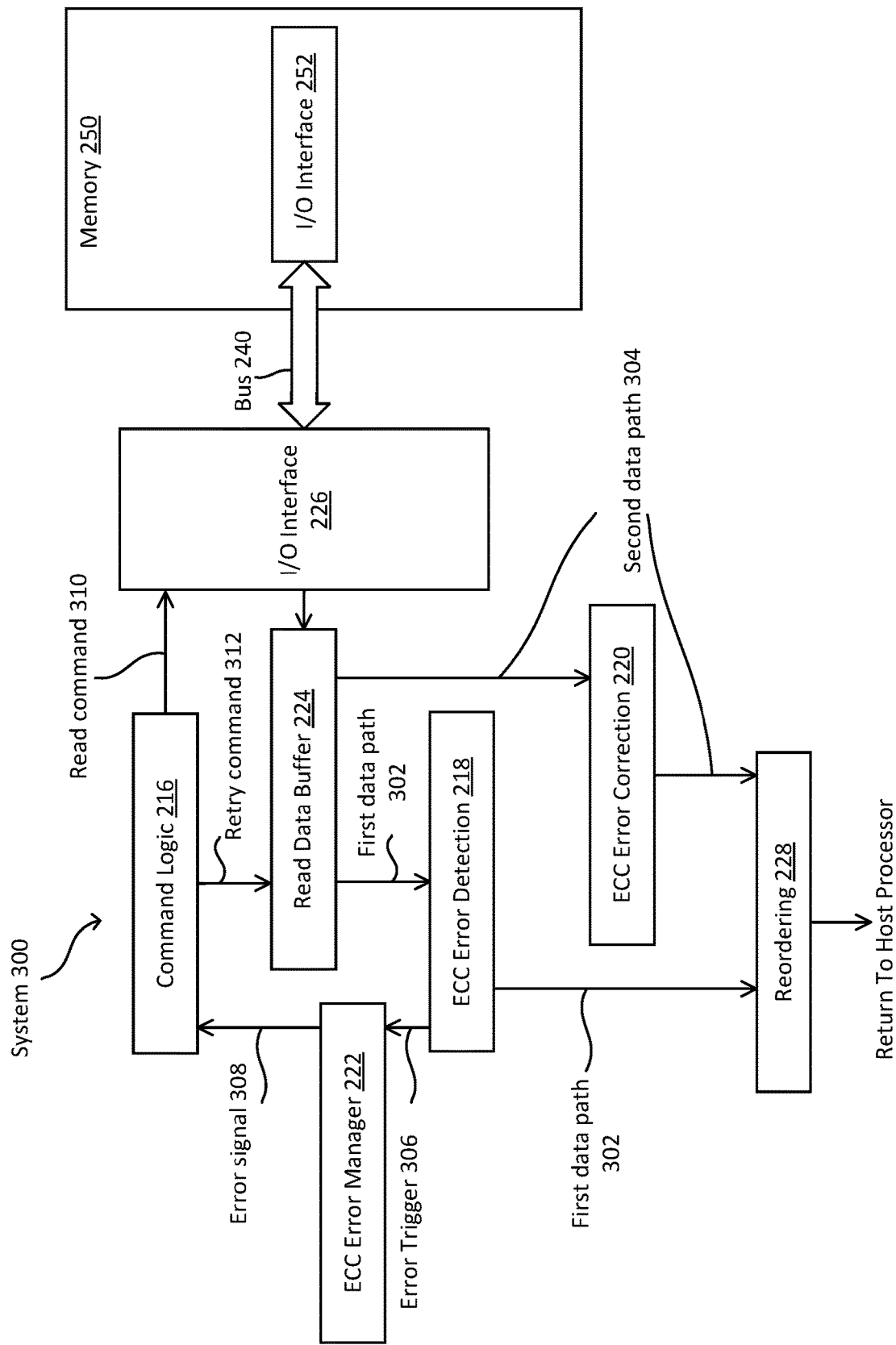
FIG. 3 is a block diagram illustrating the error checking and correction (ECC) operation.

FIG. 3 is a block diagram illustrating system 300 performing an error checking and correction (ECC) operation. Command logic 216 generates and sends a read command signal 310 to retrieve data from memory circuitry 250. Memory circuitry 250 sends the read data via I/O interface 252 and bus 240 to I/O interface 226. Read data buffer (RDB) circuitry 224 stores the read data. Command logic 216 can generate and execute multiple consecutive read command signals. RDB circuitry 224 stores the read data corresponding to each read command when command logic 216 executes multiple read commands. The ECC process is divided into two separate processes: the ECC error detection process, where the read data goes through first data path 302, and the ECC inline error correction process, where the read data goes through second data path 304.

ECC error detection logic 218 on first data path 302 receives the read data from read data buffer 224. ECC error detection logic 218 performs ECC error detection on the read data. If ECC error detection 218 does not detect any error in the read data, the memory controller returns the read data to the host processor. When the memory controller has to deliver data to the processor in a particular order, reordering logic 228 receives the read data, puts the read data in the correct order, and returns the data to the host processor (for example, processor 212 in FIG. 2). In one example, reordering logic 228 returns the read data in the order by which corresponding read commands were generated. In another example, reordering logic 228 returns the read data in the order by which corresponding read commands were executed.

When ECC error detection logic 218 detects an error in the read data, that read data is sent to the second data path 304 for ECC error correction procedure. Command logic 216 sends a retry command 312 that triggers the ECC error correction procedure.

In one example, the ECC error correction procedure is a single error correction and double error detection (SECDED) error correction code such as a Hamming code. In one example, the ECC error correction is Chipkill™ ECC that corrects multiple bit errors. In another example, the ECC error correction is Intel® single device data correction (SDDC) algorithm.

The memory error can result from any of several different sources, such as noise, interference, or physical damage. In addition, a memory error can be a transient or soft error, which can occur on one read but not be present in a subsequent read to the same location, or a permanent error or hard fault that will persist.

In one example, in response to detecting an error by ECC error detection logic 218, command logic 216 generates and sends a retry command 312. In one example, the retry command 312 is generated as follows. In response to detecting an error, ECC error detection logic 218 generates an error trigger signal 306 and sends the error trigger signal 306 to ECC error manager logic 222. In response to receiving the error trigger signal 306, ECC error manager logic 222 generates an error signal 308 and sends it to command logic 216. Finally, in response to receiving the error signal 308, command logic 216 generates a retry command 312.

In another example, in response to detecting an error, ECC error detection 218 sends the error trigger signal 306 to command logic 216. Then, in response to receiving the error trigger signal 306, command logic 216 generates a retry command 312.

Command logic 216 sends the retry command 312 to read data buffer (RDB) circuitry 224. In response to the retry command 312, RDB circuitry 224 sends the read data, in which ECC error detection logic 218 detected error(s), to ECC error correction logic 220 on second data path 304.

Figure 5:
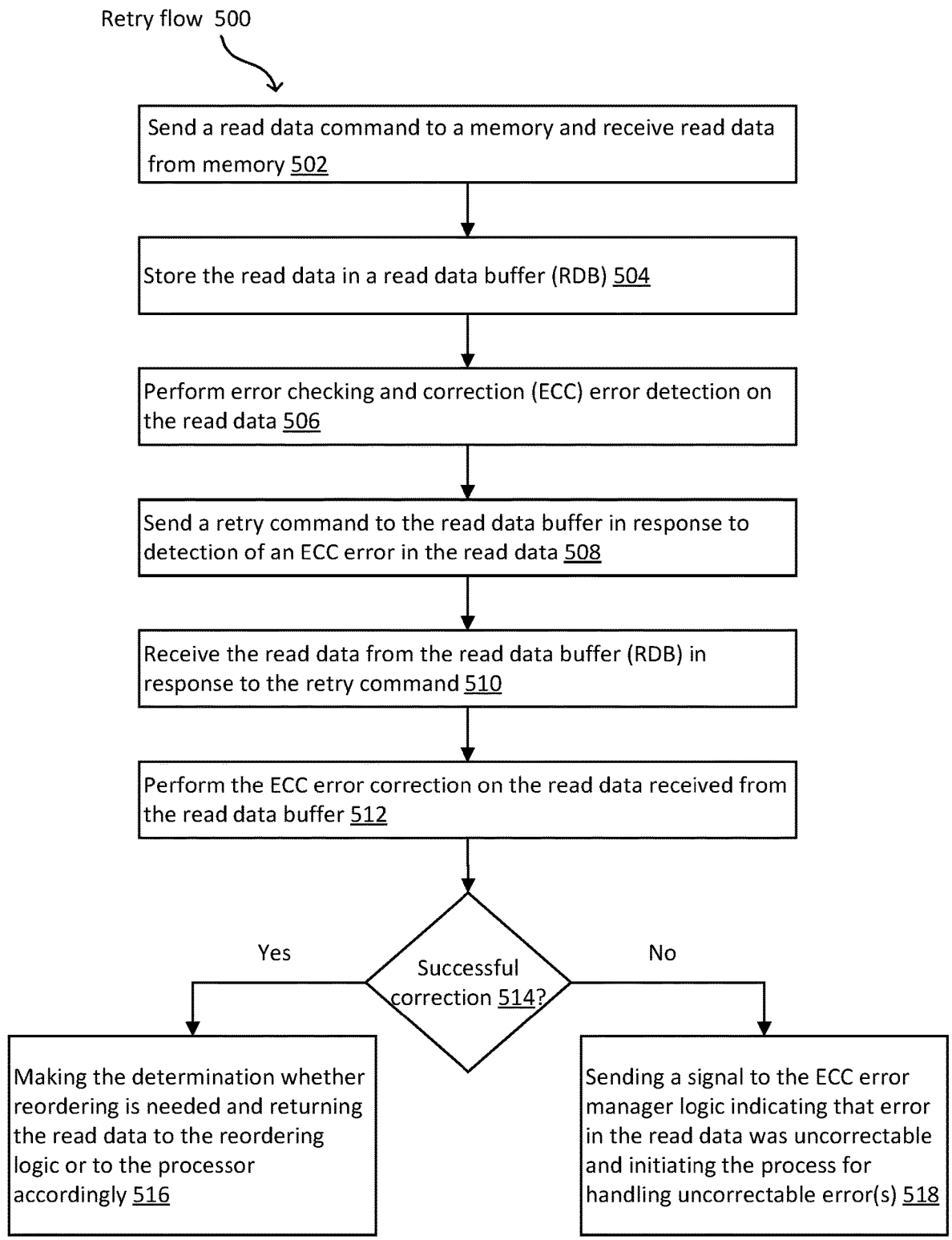
FIG. 5 is a flow diagram of an example of retry flow using the read data stored in the read data buffer (RDB) for ECC error correction.

ECC error correction logic 220 on second data path 304 receives the read data from RDB circuitry 224 and performs the ECC error correction procedure. If ECC error correction logic 220 successfully corrects the read data's error(s), it returns the read data. However, if ECC error correction logic 220 cannot correct the error(s) in the read data, it sends a signal to ECC error manager logic 222 and triggers the process for handling uncorrectable errors (for example, as shown in FIG. 5).

Using RDB circuitry 224 to reread the data for ECC error correction avoids stopping the traffic, flushing the data paths, and rereading the data from memory. The scheduler of the read and write command is not affected. After an error is detected, the data path temporarily stops reading new transactions from RDB circuitry 224. The memory controller returns any outstanding read transactions to the host processor. ECC error correction logic 220 gets the data with ECC error from RDB circuitry 224 and then performs correction. ECC correction logic 220 returns the corrected data, and reading from RDB circuitry 224 resumes.

Figure 4A:
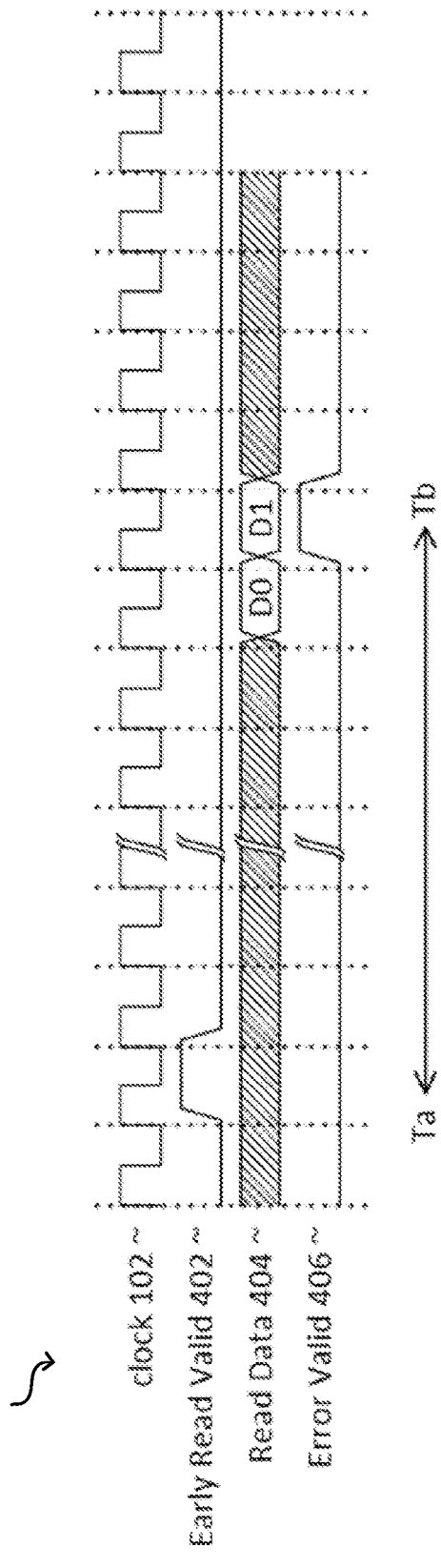
FIGS. 4A and 4B are timing diagrams for executing single and multiple read commands without error, respectively.
Figure 4B:
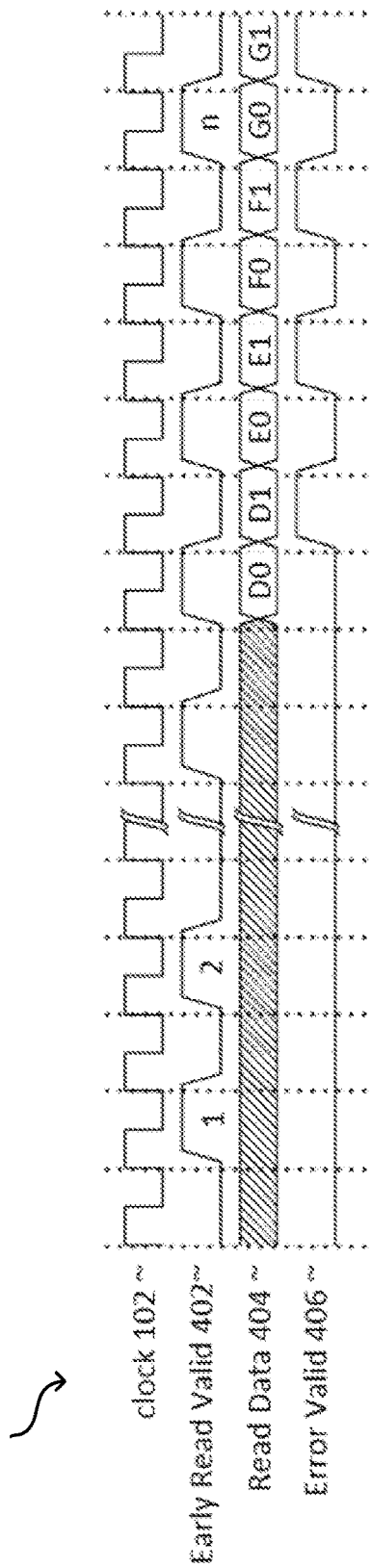
Figure 4C:
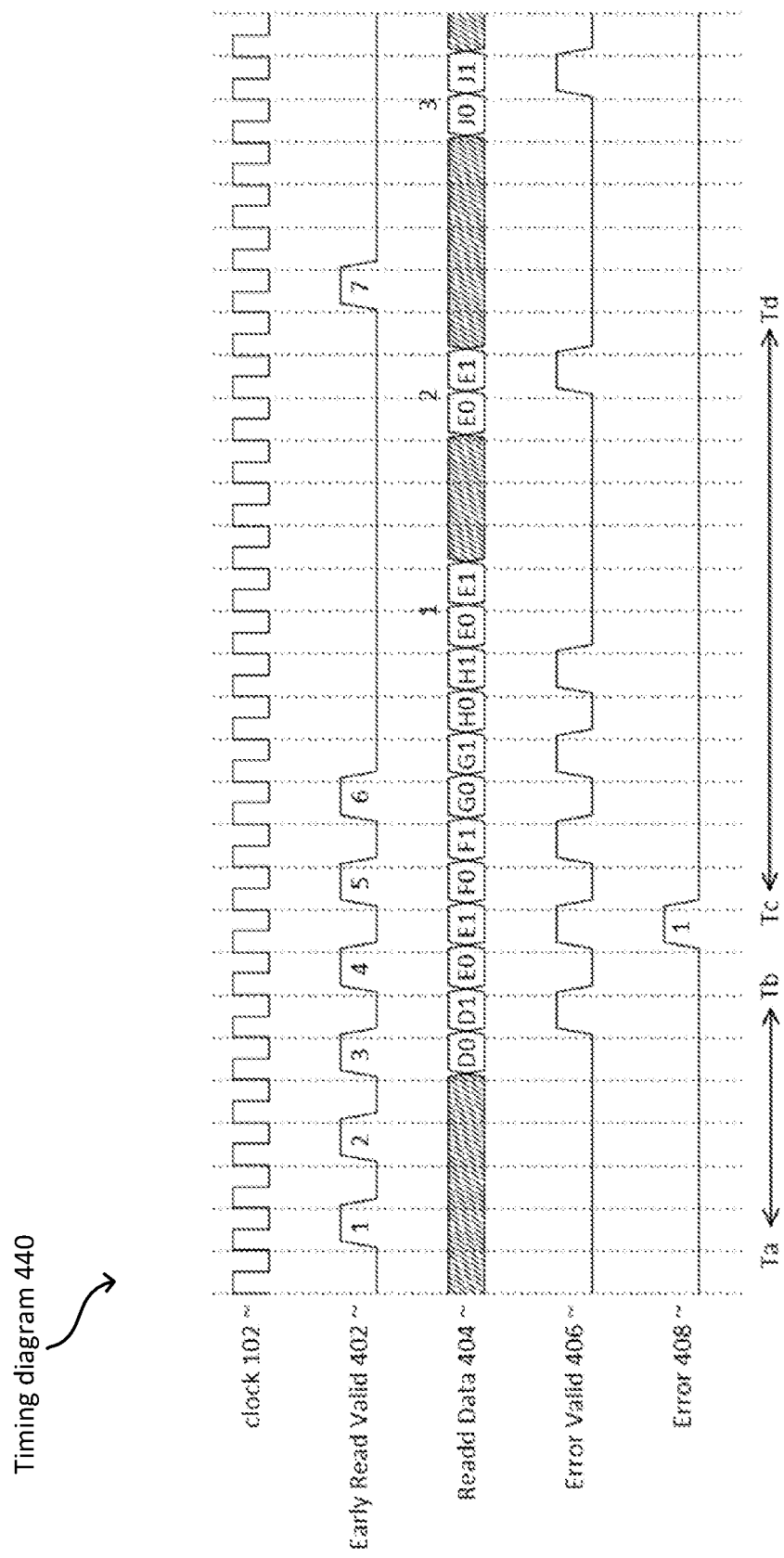
FIG. 4C is a timing diagram for the execution of multiple read commands with error.

FIGS. 4A and 4B are timing diagrams for executing single and multiple read commands without error, and FIG. 4C is a timing diagram for executing multiple read commands with an error. Timing diagram 400 illustrates the execution of a read command. In one example, when a read command is executed (for example, read command signal 310 in FIG. 3), the memory controller logic (for example, memory controller 214 in FIG. 2) generates an early read valid signal 402. Therefore, an early read valid signal indicates the execution of a read command. Early read valid signal 402 enables retrieval of the read data from memory (e.g., memory 250 in FIG. 2). Read data signal 404 is the physical appearance of the read data in the form of a signal on the internal data bus. When data associated with a read command is received, error valid signal 406 indicates that the error correction logic can perform ECC on the read data. Error signal 408 indicates whether an error is detected by ECC error detection logic 218.

In FIG. 4A, read data signal 404 shows an example of a timing of the read data going through ECC error detection logic 218. Each read data takes two clock cycles, the first part of the read data occupying the first clock cycle is indicated by a suffix 0, and the second part of the read data occupying the second cycle is indicated by a suffix 1. For example, in FIG. 4A, D0 and D1 in the read data signal 404 are the two parts of the read data D.

Early read valid signal 402 at time Ta indicates that the ECC logic is ready for receiving read data from memory. Read data signal 404 indicates that the ECC error detection has completed returning the two parts of the read data D at time Tb.

In one example implementation, the elapsed time between the generation of an early read valid signal 402 and the completion of error detection by the ECC error detection logic (for example, the ECC error detection logic 218 in FIG. 3) can take tens of clock cycles. In one example implementation, the elapsed time between the generation of an early read valid signal 402, and the completion of error detection by the ECC error detection logic (for example, the ECC error detection logic 218 in FIG. 3) is between 6 to 16 clock cycles.

In FIG. 4B, timing diagram 420 illustrates an example timing of execution of multiple read commands. When multiple read commands are executed, multiple early read valid signals 402 are generated. Multiple consecutive early read valid signals 402 are indicated by 1, 2, ..., n. Each early read valid signal is associated with a read command and a read data. For example, the early read valid signal 402 '1' is associated with the read data D, denoted by D0 and D1 in read data signal 404. Similarly, early read valid signal 402 '2' is associated with the read data E, denoted by E0 and E1 in the read data signal 404. Also, read data F (represented by read data signals 404 F0 and F1) and read data G (denoted by read data signals 404 G1 and G2) also have associated early read valid signals, which are not explicitly identified in diagram 420 due to the time break. When the ECC error detection logic (for example, the ECC error detection logic 218 in FIG. 3) accumulates both parts of the read data, the pulse or signal on error valid signal 406 indicates that ECC error detection logic can perform the detection procedure.

In one example implementation, similar to the execution of a single read command, the time elapsed between the generation of an early read valid signal 402 and completion of error detection by ECC error detection logic (for example, the ECC error detection logic 218 in FIG. 3) can take tens of clock cycles. In another example implementation, the time elapsed between the generation of an early read valid signal 402 and completion of error detection by the ECC error detection logic (for example, the ECC error detection logic 218 in FIG. 3) is between 6 to 16 clock cycles.

FIG. 4C illustrates an example timing diagram of ECC error correction using a retry command to access data from an RDB. In one example, when the ECC detection logic detects an error in the read data, it triggers the command logic to execute a retry command. When the command logic executes the retry command, the memory controller allows RDB circuitry to receive all read data corresponding to early read valid signals issued before execution of the retry command. The memory controller stops executing read commands issued after the execution of the retry command. In one example, the memory controller stops executing read commands issued after the execution of the retry command for tens of clock cycles. In response to a retry signal, the ECC error correction (for example, the ECC error correction logic 220 in FIG. 3) receives the read data from the RDB. Regular data traffic is blocked when read data goes through the ECC error correction logic 220.

In example timing diagram 440, the early read valid signals 402 indicated by 'V', '2', '3', '4', and '5' are associated with the read data D (D0 and D1), E (E0 and E1), F (F0 and F1), G (G0 and G1), and H (H0 and H1), respectively. The error signal 408 '1' indicates detecting an error in the read data E and triggers the command logic to execute a retry command. Early read valid signals at 402 '3' and '4', corresponding to read data F and G, are issued before execution of the retry command. Therefore, the memory controller allows retrieval of the read data F and G, associated with early read valid signals 402 '3' and '4', from memory. In one example, the early read valid signal 402 '5' is also allowed to be completed because it is close in time to the detection of an error in the read data E. Therefore, the memory controller permits the read data H to be read.

The error detected in the read data E triggers the command logic to generate a retry command signal. The retry command signal is sent to the RDB to reread the read data E and send it to the ECC error correction logic. Early read valid signal 402 '6' is generated in response to the retry command signal. In response to the retry command and early read valid signal 402 '6', RDB sends the read data E to the ECC error correction shown by read data signal 404 '1'. Read data signal 404 '2' shows the read data E that ECC error correction logic returns and the corresponding error signal 408 indicates that the ECC error correction successfully corrected the error. Finally, early read valid signal 402 '7' resumes reading data from memory, and after a few clock cycles, the read data J (J0 and J1) are available at the memory controller as shown on read data signal 404 '3'.

In one example, at time Tc, error signal 408 '1' indicates that the ECC error detection logic detected the error in the read data E. The ECC error correction logic returns the corrected read data E to the host processor at time Td. The time elapsed between detecting the error at time Tc and returning the corrected data at time Td can take tens of clock cycles when the retry flow rereads the read data E from the RDB. Traditionally, the time between detecting the error and returning the corrected data could take thousands of clock cycles. Reading the data from RDB in the retry flow reduces the ECC correction time from thousands of clock cycles to tens of clock cycles.

In one implementation example, the read data is available six (6) clock cycles after an early read valid signal 402. For example, in FIG. 4C, the read data D, represented by the signal 404 D0 and D1, is available six (6) clock cycles after the early read valid signal at 402 '1'.

In another example implementation, the read data can be available 16 clock cycles after an early read valid signal 402.

Each read data spans two clock cycles. For example, in FIG. 4C, D0 and D1 are two segments of the read data D, and each part takes one clock cycle. Thus, it takes two (2) clock cycles to accumulate the data and pass it to ECC error detection logic 218 or ECC error correction logic 220.

The ECC error correction procedure can be a complex algorithm. The more complex ECC error correction procedure would require more clock cycles to complete. In one example implementation, the ECC error correction procedure takes three (3) clock cycles to complete the full correction. Once the ECC error correction procedure successfully corrects the error(s) in the read data, the corrected read data is returned to the processor. When the memory controller has to deliver data to the processor in a particular order, the reordering logic 228 receives the read data, puts the read data in the correct order, and returns the data to the host processor (for example, processor 212 in FIG. 2).

In one example implementation, the system resumes new transactions at least one clock cycle after completing the ECC error correction.

In one example implementation, the ECC error correction procedure blocks the traffic and regular transactions for 12 clock cycles. In another example implementation, the ECC error correction procedure blocks the traffic and regular transactions for 22 clock cycles.

FIG. 5 is a flow diagram of a retry flow 500 using the read data stored in the read data buffer (RDB) for ECC error correction. In block 502, the memory receives a read data command and sends the read data to the host. In block 504, the read data buffer (RDB) receives the read data from memory and stores it. In block 506, the error checking and correction (ECC) receives the data from the RDB and performs ECC error detection on the read data. In block 508, discovering an error in the read data, the ECC error detection logic sends an error indication to the command logic, and in response to the error indication, the command logic sends a retry command. In block 510, the ECC error correction logic receives the read data from the RDB in response to the retry command from the command logic. In block 512, the ECC error correction logic performs the ECC error correction on the read data received from the RDB. Next, in block 514, the ECC error correction logic decides whether the ECC error correction was successful in correcting the error in the read data. If the ECC error correction logic could not correct the error, in block 518, the ECC error correction logic sends a signal to the ECC error manager logic indicating that the error in the read data was uncorrectable and initiates the process for handling uncorrectable error(s). However, if the ECC error correction logic successfully corrected the error in the read data, then the ECC error correction logic will return the read data, as described in block 516. In block 516, the system, e.g., the processor, memory controller, host, or combination of them, decides whether reordering is needed. Reordering is necessary when the order of data is essential for the processor. If reordering is necessary, the returned read data is delivered to the reordering logic; otherwise, the read data is sent to the processor.

Figure 6:
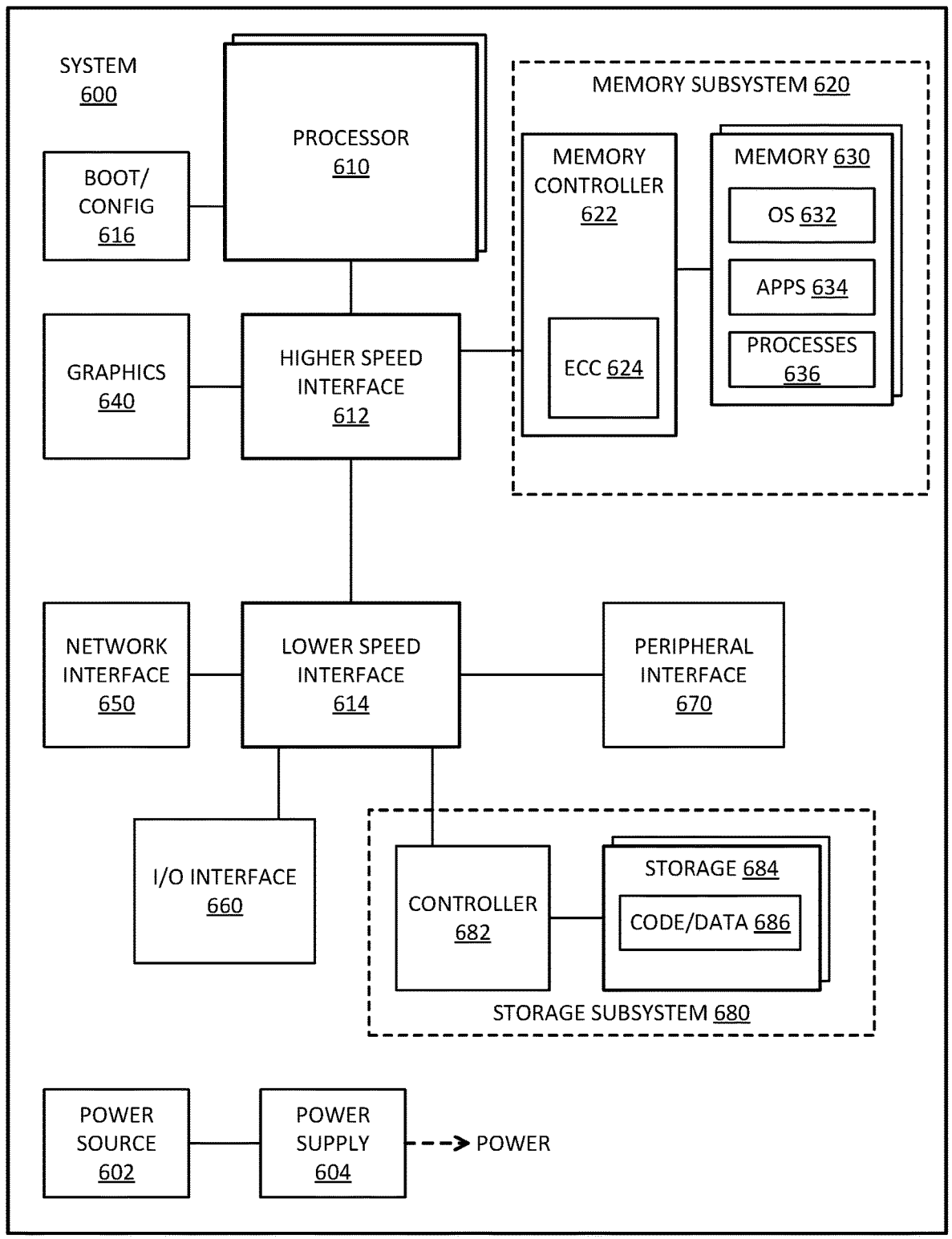
FIG. 6 is a block diagram of an example of a computing system that can implement retry flow using read data buffer for ECC error correction.

FIG. 6 is a block diagram of an example of a computing system that can implement retry flow using read data buffer for ECC error correction. System 600 represents a computing device in accordance with any example herein and can be a laptop computer, a desktop computer, a tablet computer, a server, a gaming or entertainment control system, an embedded computing device, or other electronic devices.

In one example, memory controller 622 includes ECC 624 to perform error checking and correction on data of memory 630. In one example, ECC 624 can detect errors in the read data and perform retry flow. In response to detecting an error in a read data, the retry flow retrieves the read data from a read data buffer to be used for ECC error correction.

System 600 includes processor 610 can include any type of microprocessor, central processing unit (CPU), graphics processing unit (GPU), processing core, or other processing hardware, or a combination, to provide processing or execution of instructions for system 600. Processor 610 can be a host processor device. Processor 610 controls the overall operation of system 600 and can be or include one or more programmable general-purpose or special-purpose microprocessors, digital signal processors (DSPs), programmable controllers, application specific integrated circuits (ASICs), programmable logic devices (PLDs), or a combination of such devices.

System 600 includes boot/config 616, which represents storage to store boot code (e.g., basic input/output system (BIOS)), configuration settings, security hardware (e.g., trusted platform module (TPM)), or other system level hardware that operates outside of a host OS (operating system). Boot/config 616 can include a nonvolatile storage device, such as read-only memory (ROM), flash memory, or other memory devices.

In one example, system 600 includes interface 612 coupled to processor 610, which can represent a higher speed interface or a high throughput interface for system components that need higher bandwidth connections, such as memory subsystem 620 or graphics interface components 640. Interface 612 represents an interface circuit, which can be a standalone component or integrated onto a processor die. Interface 612 can be integrated as a circuit onto the processor die or integrated as a component on a system on a chip. Where present, graphics interface 640 interfaces to graphics components for providing a visual display to a user of system 600. Graphics interface 640 can be a standalone component or integrated onto the processor die or system on a chip. In one example, graphics interface 640 can drive a high definition (HD) display or ultra high definition (UHD) display that provides an output to a user. In one example, the display can include a touchscreen display. In one example, graphics interface 640 generates a display based on data stored in memory 630 or based on operations executed by processor 610 or both.

Memory subsystem 620 represents the main memory of system 600 and provides storage for code to be executed by processor 610 or data values to be used in executing a routine. Memory subsystem 620 can include one or more varieties of random-access memory (RAM) such as DRAM, 3DXP (three-dimensional crosspoint), or other memory devices, or a combination of such devices. Memory 630 stores and hosts, among other things, operating system (OS) 632 to provide a software platform for executing instructions in system 600. Additionally, applications 634 can execute on the software platform of OS 632 from memory 630. Applications 634 represent programs with their own operational logic to execute one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610, such as integrated onto the processor die or a system on a chip.

While not explicitly illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other buses, or a combination.

In one example, system 600 includes interface 614, which can be coupled to interface 612. Interface 614 can be a lower speed interface than interface 612. In one example, interface 614 represents an interface circuit, which can include standalone components and integrated circuitry. In one example, multiple user interface components, peripheral components, or both are coupled to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can exchange data with a remote device, which can include sending data stored in memory or receiving data to be stored in memory.

In one example, system 600 includes one or more input/output (I/O) interface(s) 660. I/O interface 660 can include one or more interface components through which a user interacts with system 600 (e.g., audio, alphanumeric, tactile/touch, or other interfacings). Peripheral interface 670 can include any hardware interface not specifically mentioned above. Peripherals refer generally to devices that connect dependently to system 600. A dependent connection is one where system 600 provides the software platform or hardware platform or both on which operation executes and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, NAND, 3DXP, or optical based disks, or a combination. Storage 684 holds code or instructions and data 686 in a persistent state (i.e., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (i.e., the value or state of the data is indeterminate if power is interrupted to system 600). In one example, storage subsystem 680 includes controller 682 to interface with storage 684. In one example, controller 682 is a physical part of interface 614 or processor 610 or can include circuits or logic in both processor 610 and interface 614.

Power source 602 provides power to the components of system 600. More specifically, power source 602 typically interfaces to one or multiple power supplies 604 in system 600 to provide power to the components of system 600. In one example, power supply 604 includes an AC to DC (alternating current to direct current) adapter to plug into a wall outlet. Such AC power can be renewable energy (e.g., solar power) power source 602. In one example, power source 602 includes a DC power source, such as an external AC to DC converter. In one example, power source 602 or power supply 604 includes wireless charging hardware to charge via proximity to a charging field. In one example, power source 602 can include an internal battery or fuel cell source.

In Example 1, a memory controller includes: error detection logic on a first data path to receive read data from a read data buffer (RDB) circuitry, in response to a read command sent to a memory, and perform error checking and correction (ECC) error detection on the read data; and error correction logic on a second data path to perform ECC error correction in response to detection of an ECC error in the read data by the error detection logic, the error correction logic to receive the read data from the RDB circuitry in response to a retry command sent to the RDB circuitry.

In Example 2, the memory controller of example 1, further comprising a command logic to send the retry command to the RDB circuitry in response to receiving an error signal.

In Example 3, the memory controller of any preceding example, further comprising an error manager logic to send the error signal to the command logic when the ECC error detected by the error detection logic.

In Example 4, the memory controller of any preceding example, wherein all read data corresponding to early read valid signals issued before execution of the retry command to be received by the RDB circuitry.

In Example 5, the memory controller of any preceding example, the memory controller is to stop executing read commands issued after execution of the retry command for tens of clock cycles.

In Example 6, the memory controller of any preceding example, the memory controller is to stop reading from the RDB circuitry for new transactions in response to the retry command.

In Example 7, the memory controller of any preceding example, further comprising a reordering logic to return the read data in an order by which corresponding read commands were generated.

In Example 8, the memory controller of any preceding example, wherein the error correction logic to include single device data correction (SDDC).

In Example 9, the memory controller of any preceding example, wherein the error correction logic to perform error correction procedure that is longer than 2 cycles.

In Example 10, the memory controller of any preceding example, wherein the RDB circuitry is a scratchpad memory.

In Example 11, a computer system includes: a processor; and a memory controller comprising: error detection logic on a first data path to receive read data from a read data buffer (RDB) circuitry, in response to a read command sent to a memory, and perform error checking and correction (ECC) error detection on the read data; and error correction logic on a second data path to perform ECC error correction in response to detection of an ECC error in the read data by the error detection logic, the error correction logic to receive the read data from the RDB circuitry in response to a retry command sent to the RDB circuitry.

In Example 12, the computer system of Example 11, wherein the memory controller further comprising a command logic to send the retry command to the RDB circuitry in response to receiving an error signal.

In Example 13, the computer system of any preceding example, wherein the memory controller further comprising an error manager logic to send the error signal to the command logic when the ECC error detected by the error detection logic.

In Example 14, the computer system of any preceding example, wherein the memory controller to stop executing read commands issued after execution of the retry command for tens of clock cycles.

In Example 15, the computer system of any preceding example, wherein the memory controller to stop reading from the RDB circuitry for new transactions in response to the retry command.

In Example 16, the computer system of any preceding example, the error correction logic to include single device data correction (SDDC).

In Example 17, the computer system of any preceding example, wherein one or more of: the processor comprises a multicore host processor; the computer system includes a display communicatively coupled to the processor; the computer system includes a network interface communicatively coupled to the processor; or the computer system includes a battery to power the computer system.

In Example 18, a method includes: sending a read data command to a memory; receiving read data from the memory; storing the read data in a read data buffer (RDB) circuitry; performing error checking and correction (ECC) error detection on the read data; and in response to detection of an ECC error in the read data: sending a retry command to the read data buffer circuitry; and in response to the retry command: receiving the read data from the read data buffer (RDB) circuitry; and performing ECC error correction on the read data received from the read data buffer circuitry.

In Example 19, the method of Example 18, wherein sending the retry command in response to receiving an error signal.

In Example 20, the method of any preceding example, wherein performing ECC error correction includes performing single device data correction (SDDC).

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine-readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. A memory controller, comprising:
a read data buffer (RDB) circuit to store multiple read data elements from a memory in response to a series of read commands, including a first data element in response to a first read command;
error detection logic on a first data path from the RDB circuit to a host to perform error checking and correction (ECC) error detection on the first data element from the RDB circuit, and provide the first data element to the host in response to detection of no errors in the first data element and generate an error detection signal in response to detection of an error in the first data element; and
error correction logic on a second data path from the RDB circuit to the host, in response to the error detection signal, to receive the first data element from the RDB instead of retrieving the first data element from the memory with a second read command, and to perform error correction on the first data element before providing the first data element to the host.

2. The memory controller of claim 1, further comprising command logic to send a retry command to the RDB circuit in response to the error detection signal.

3. The memory controller of claim 1, further comprising error manager logic to generate an early read valid signal for each of the series of read commands to indicate that the error detection logic is ready to a corresponding data element from the RDB.

4. The memory controller of claim 3, wherein data elements in the RDB with a corresponding early read valid are not flushed from the RDB in response to the error detection signal, and data elements without a corresponding early read valid signal are flushed from the RDB in response to the error detection signal.

5. The memory controller of claim 3, wherein the RDB is to stop receiving new read data elements until the error correction logic completes the error correction on the first data element.

6. The memory controller of claim 1, further comprising reordering logic to receive the first data element from the error correction logic and reorder a series of data elements to be sent to the host, from an order of receipt to an order of the series of read commands.

7. The memory controller of claim 1, wherein the error correction logic comprises circuitry to perform single device data correction (SDDC).

8. The memory controller of claim 1, wherein the error correction logic comprises error correction circuitry that takes more than 2 cycles for a read data element to propagate through.

9. The memory controller of claim 1, wherein the RDB circuit is a scratchpad memory.

10. A computer system, comprising:
a processor; and
a memory controller including:
a read data buffer (RDB) circuit to store multiple read data elements from a memory in response to a series of read commands, including a first data element in response to a first read command;
error detection logic on a first data path from the RDB circuit to a host to perform error checking and correction (ECC) error detection on the first data element from the RDB circuit, and provide the first data element to the host in response to detection of no errors in the first data element and generate an error detection signal in response to detection of an error in the first data element; and
error correction logic on a second data path from the RDB circuit to the host, in response to the error detection signal, to receive the first data element from the RDB instead of retrieving the first data element from the memory with a second read command, and to perform error correction on the first data element before providing the first data element to the host.

11. The computer system of claim 10, the memory controller further comprising command logic to send a retry command to the RDB circuit in response to the error detection signal.

12. The computer system of claim 10, the memory controller further comprising error manager logic to generate an early read valid signal for each of the series of read commands to indicate that the error detection logic is ready to a corresponding data element from the RDB.

13. The computer system of claim 12, wherein the RDB is to stop receiving new read data elements until the error correction logic completes the error correction on the first data element.

14. The computer system of claim 11, wherein the error correction logic comprises circuitry to perform single device data correction (SDDC).

15. The computer system of claim 10, wherein one or more of:
the processor comprises a multicore host processor;
the computer system includes a display communicatively coupled to the processor;
the computer system includes a network interface communicatively coupled to the processor; or
the computer system includes a battery to power the computer system.

16. The computer system of claim 12, wherein data elements in the RDB with a corresponding early read valid are not flushed from the RDB in response to the error detection signal, and data elements without a corresponding early read valid signal are flushed from the RDB in response to the error detection signal.

17. The computer system of claim 10, the memory controller further comprising reordering logic to receive the first data element from the error correction logic and reorder a series of data elements to be sent to the host, from an order of receipt to an order of the series of read commands.

18. The computer system of claim 10, wherein the error correction logic comprises error correction circuitry that takes more than 2 cycles for a read data element to propagate through.

19. The computer system of claim 10, wherein the RDB circuit is a scratchpad memory.

\* \* \* \* \*